United States Patent
Mueller

(10) Patent No.: US 6,231,904 B1
(45) Date of Patent: May 15, 2001

(54) FROZEN CONFECTION PACKAGE WITH NOVELTY INK STAMP

(76) Inventor: Martin Mueller, 4929 E. Lake Shore Dr., Wonder Lake, IL (US) 60097

( * ) Notice: Subject to any disclaimer, the term of this patent is extended or adjusted under 35 U.S.C. 154(b) by 795 days.

(21) Appl. No.: 08/601,461

(22) Filed: Feb. 14, 1996

Related U.S. Application Data

(63) Continuation of application No. 08/400,660, filed on Mar. 8, 1995, now abandoned.

(51) Int. Cl.[7] ............................... A23G 3/00; B65D 83/00
(52) U.S. Cl. ....................... 426/112; 426/115; 426/130; 426/394; 101/333; 101/405; 206/817
(58) Field of Search ............................ 426/104, 91, 110, 426/115, 130, 87, 112, 394; 101/333, 405

(56) References Cited

U.S. PATENT DOCUMENTS

| | | | | |
|---|---|---|---|---|
| 204,421 | * | 6/1878 | Chamberlain | 101/333 |
| 377,974 | * | 2/1888 | Wheless | 101/333 |
| 1,353,703 | * | 9/1920 | Babcock | 101/405 |
| 1,486,445 | * | 3/1924 | Mayol | 426/115 |
| 1,607,660 | * | 11/1926 | Zabriskie | 101/405 |
| 1,933,596 | * | 11/1933 | MacLean | 426/134 |
| 2,093,635 | * | 9/1937 | Cunningham | 101/333 |
| 2,156,482 | * | 5/1939 | Robb | 426/134 |
| 2,166,619 | * | 7/1939 | Becker | 426/115 |
| 2,235,964 | * | 3/1941 | Meyer et al. | 426/130 |
| 2,627,227 | * | 2/1953 | Claggett et al. | 101/333 |
| 3,085,883 | * | 4/1963 | Collier | 426/134 |
| 3,140,954 | * | 7/1964 | Schroeder | 426/134 |
| 3,342,609 | * | 9/1967 | Bank et al. | 426/110 |
| 3,417,862 | * | 12/1968 | Fong | 426/110 |
| 3,432,027 | * | 3/1969 | Mueller | 426/115 |
| 3,595,449 | * | 7/1971 | Stump | 426/110 |
| 3,663,717 | * | 5/1972 | Coster | 426/134 |
| 3,968,262 | * | 7/1976 | Hodska | 426/134 |
| 4,593,618 | * | 6/1986 | Lebensfeld | 101/405 |
| 4,828,163 | * | 5/1989 | Yu | 426/115 |
| 5,111,973 | * | 5/1992 | Mueller | 426/130 |

FOREIGN PATENT DOCUMENTS

| | | | | |
|---|---|---|---|---|
| 109386 | * | 3/1939 | (AU) | 426/110 |
| 488447 | * | 6/1992 | (EP) | 426/104 |
| 1047276 | * | 12/1951 | (FR) | 426/104 |
| 2397793 | * | 2/1979 | (FR) | 426/104 |
| 101833 | * | 5/1963 | (NO) | 426/115 |

* cited by examiner

*Primary Examiner*—Steven Weinstein
(74) *Attorney, Agent, or Firm*—Rockey, Milnamow, Katz, Ltd.

(57) ABSTRACT

A "push-up" type package for a frozen confection includes a cylindrical tube, and a plunger member slidably positionable within the tube for pushing a frozen confection product from within the tube. The plunger member includes a piston-like pushing portion, and a generally elongated handle portion extending therefrom. The pushing portion of the plunger member includes a surface which defines printing indicia, such as a character, letter, number, etc., which permits the plunger member to be used as an ink stamp after consumption of the frozen confection. The configuration of the plunger member, including an elongated handle, permits it to function naturally as an ink stamp, so that ink can be applied to the printing indicia, and thereafter, inked impressions of the printing indicia applied to suitable paper or other surfaces.

8 Claims, 1 Drawing Sheet

FROZEN CONFECTION PACKAGE WITH NOVELTY INK STAMP

This is a continuation, of application U.S. Ser. No. 08/400,660, filed Mar. 8. 1995, now abandoned.

TECHNICAL FIELD

The present invention relates generally to packaging for frozen confections or novelties, and more particularly to a "push-up" type package for a frozen confection which includes a plunger member which can be used as a novelty ink stamp after consumption of the confection.

BACKGROUND OF THE INVENTION

Frozen confections or novelties, such as frozen pops and the like, have enjoyed widespread popularity for many years. These types of confections can be provided in bar form with a stick-like handle, and can also be provided in the packaging which functions to hold and "dispense" the product as it is consumed.

One type of common packaging for such confections is of the "push-up" type, including a generally cylindrical tube within which the frozen confection is placed, and a plunger member slidably movable within the tube so that the confection can be pushed from the tube and easily consumed.

Ordinarily the packaging for frozen confections is disposed of after the confection is consumed. However, the present invention contemplates a package for a frozen confection which permits use of the package for play or other activities by children.

SUMMARY OF THE INVENTION

The present invention is directed to a package for a frozen confection which includes a portion which can function as an ink stamp after consumption of the confection. Thus, after a user has enjoyed the confection, the portion of the package which functions as an ink stamp can be removed, cleaned as necessary, and have ink applied thereto so that it can be used to form inked impressions on paper or other materials. It is contemplated that the present package can be used to provide ink stamp-like elements having a wide variety of printing indicia thereon, such as characters, letters, numbers, etc., to enhance the "play value" of the arrangement. Additionally, use of the present package desirably promotes marketing of the associated confection, since a highly desirable benefit is provided, apart from the confection itself.

In accordance with the illustrated embodiment, the present package includes a generally elongated cylindrical tube which defines a hollow interior within which a frozen confection, such as ice cream or sherbet, is held. In the preferred embodiment, the cylindrical tube comprises spirally-wound paper material, but other suitable materials, such as plastic, can be employed.

The present package further includes a plunger member positioned generally within one end of the cylindrical tube for sliding movement therein. By this sliding movement, the frozen confection can be pushed from within the cylindrical tube by the plunger member for consumption of the confection. The plunger member includes a piston-like pushing portion which is generally planar, and which has a surface which engages the frozen confection as the confection is urged from the cylindrical tube. The plunger member further includes a elongated handle portion, extending from the pushing portion out of the cylindrical tube to facilitate sliding movement of the plunger member within the cylindrical tube.

In accordance with the present invention, the surface of the pushing portion defines relatively raised printing indicia, provided in the form of raised ridge-like elements, which are configured for receiving printing ink from an associated source. By this arrangement, after consumption of the confection, the plunger member can be removed from the cylindrical tube, and used as a novelty ink stamp. As will be appreciated, the configuration of the plunger member, including an elongated handle portion, naturally facilitates its use as an ink stamp, with the arrangement configured for easy use by children.

In the preferred form, the pushing portion of the plunger member includes a peripheral skirt which extends generally from the surface on which the printing indicia is provided in the direction of the handle portion. In the illustrated embodiment, the handle portion of the plunger member is formed unitarily (i.e., as one piece) with the pushing portion, but it will be understood that the pushing portion and handle portion may be separate components, and may be formed from dissimilar materials, and assembled for use of the package.

Other features and advantages of the present invention will become readily apparent from the following detailed description, the accompanying drawings, and the appended claims.

DETAILED DESCRIPTION

Figure 1:
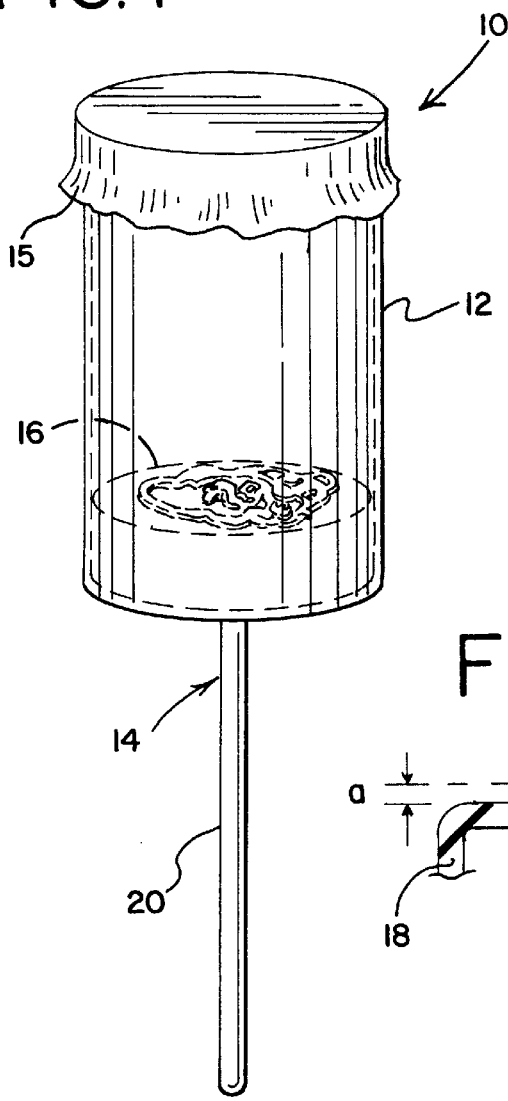
FIG. 1 is a perspective view of a package for a frozen confection embodying the principles of the present invention.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

Figure 2:
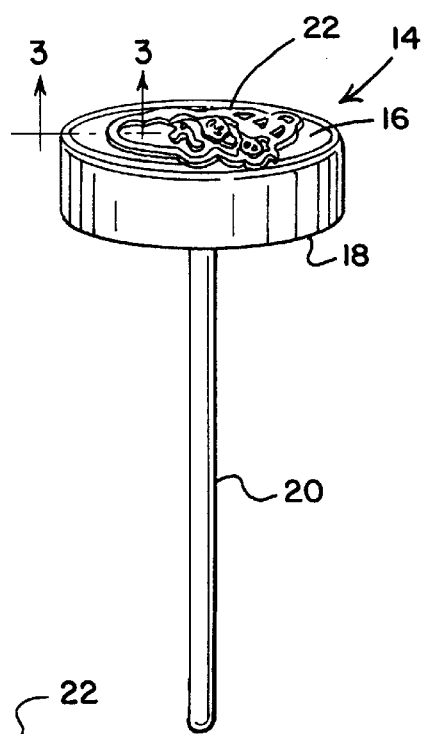
FIG. 2 is a perspective view of a plunger member of the package shown in FIG. 1.
Figure 3:
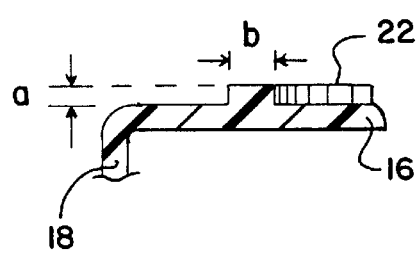
FIG. 3 is a fragmentary, cross-sectional view, taken along lines 3—3 of FIG. 2.

With reference to FIGS. 1–3, therein is illustrated a package 10 for a frozen confection, such as ice cream, yogurt, or sherbet. As will be recognized, the present package 10 is configured generally as a so-called "push-up" type package, and includes a generally cylindrical tube 12 within which a plunger member 14 is slidably positionable. With the plunger member positioned generally at one end of the tube, as illustrated in FIG. 1, the frozen confection is provided within the hollow interior of the tube, generally above the plunger member (referring to the orientation of FIG. 1) so that sliding movement of the plunger member acts to urge the frozen confection from the opposite end of the cylindrical tube 12. The frozen confection can thereby be easily consumed without the need for a spoon or the like, with periodic upward movement of plunger member 14 exposing the frozen confection from the end of the tube 12 for consumption.

A removable end seal 15 is provided for closing the end of the tube which is opposite the plunger member, thereby covering the confection within the tube prior to consumption. In the preferred form, the cylindrical tube comprises spirally-wound paper material, as known in the art, but it will be appreciated that the tube 12 can be otherwise configured (such as by formation from plastic material) in keeping with the principles disclosed herein. It is within the purview of the present invention that the complementary tube 12 and plunger member 14 can be configured in shapes other than circular, such as rectangular, triangular, star-shaped, etc.

The plunger member 14 includes a piston-like, circular, generally planar pushing portion 16 having a surface which engages the frozen confection as the plunger member is urged upwardly within tube 12. In the preferred embodiment, the pushing portion has a generally downwardly open configuration, and includes a peripheral skirt portion 18 which depends from the surface of the pushing portion and slidingly engages the inside diameter of the cylindrical tube 12.

The plunger member 14 further includes an elongated handle portion 20 extending from the pushing portion and out of the tube 12, with the peripheral skirt 18 extending generally in the same direction as the handle portion 20. In a current embodiment, the handle portion 20 is formed unitarily (i.e., as one piece) with the pushing portion 16, but it is to be understood that the handle portion can be provided as a separate component which can be connected to the piston-like pushing portion for use.

In accordance with the present invention, the surface of the pushing portion 16 of plunger member 14 defines relatively raised printing indicia 22 which permits the plunger member to be used as an ink stamp. As illustrated, the printing indicia 22 may be provided in the form of a character (with a clown-like face being shown), but it is to be understood that the printing indicia can be provided in an almost unlimited number of forms, such as in the form of letters, numbers, animals, characters, or the like. As illustrated in FIG. 3, it is presently preferred that the printing indicia 22 comprise at least one relatively raised printing surface which is spaced from the remaining surface of the pushing portion by a dimension a, about 0.03 inches to facilitate use of an ink stamp. In order to provide an adequate surface upon which printing ink can be applied, it is presently preferred that the raised printing surface of the printing indicia 22 has a transverse dimension b of at least about 0.04 inches, thus further facilitating use of the plunger member as an ink stamp. These preferred dimensions are intended as illustrative, and should not be construed as limiting the present invention, since the printing indicia 22 can be provided in a wide variety of specific forms.

The plunger member 14 can be formed from suitable moldable plastic materials such from polyethylene, polypropylene, polystyrene, and the like, but it is to be understood that a wide variety of materials can be employed for formation of the plunger member. Additionally, the handle portion 20 and the pushing portion 16 can be formed of dissimilar materials, such as formation of the pushing portion from moldable plastic, and formation of the handle portion from wood.

Figure 4:
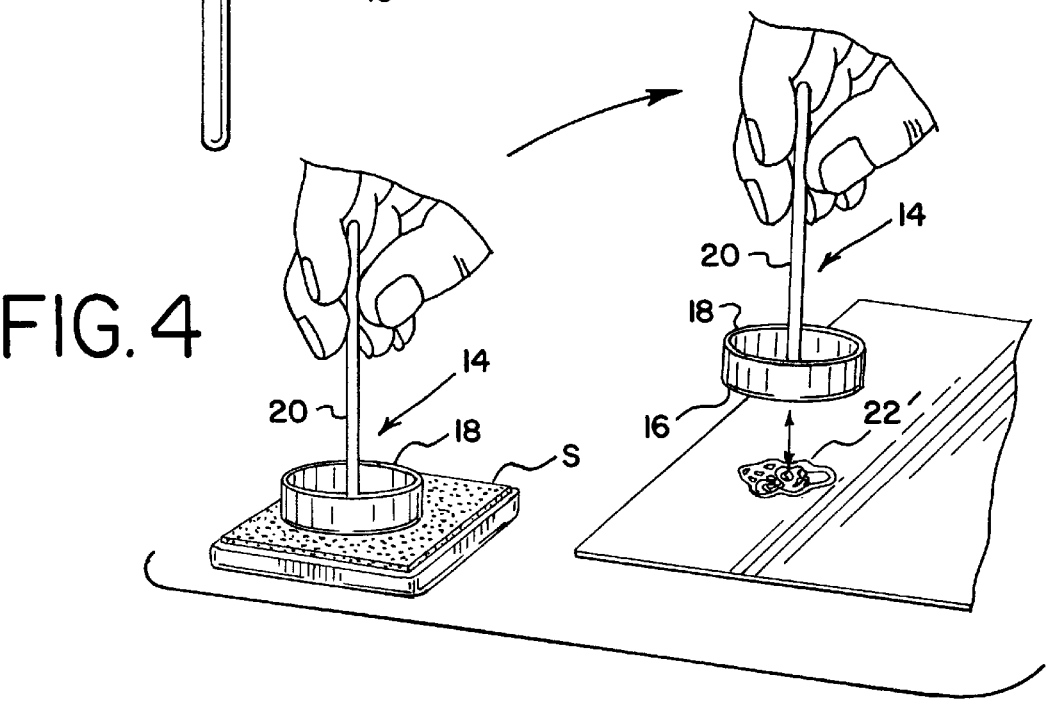
FIG. 4 is a perspective view illustrating the plunger member of FIG. 2 being used as an ink stamp, in accordance with the present invention.

FIG. 4 illustrates use of the plunger member 14 of the present package as an ink stamp. After removal of end seal 15 and consumption of the frozen confection within the package 10, the plunger member 14 is removed from the cylindrical tube 12. Printing ink is then applied to the printing indicia 22, such as by pressing the plunger member 14 against an associated ink stamp S. As will be observed, the configuration of the plunger member 14, including the piston-like pushing portion and elongated handle portion, permits the plunger portion to be used quite naturally as an ink stamp.

After ink is applied to the printing indicia 22, the plunger member/ink stamp is urged against an associated piece of paper or the like, thereby creating an inked impression 22' corresponding to the printing indicia 22. Providing different plunger members 14 with a different printing indicia 22 enhances the play value for children, encourages collection of the various plunger members, and provides highly effective marketing for the associated frozen confection product.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

What is claimed is:

1. A package for a frozen confection, comprising:
a cylindrical tube having a hollow interior within which a frozen confection is held; and
a plunger member positioned generally within one end of said cylindrical tube for sliding movement therein for pushing the frozen confection from within said tube for consumption,
said plunger member including a generally planar pushing portion having a surface which engages the frozen confection, and an elongated handle portion, extending from said pushing portion and out of said cylindrical tube for moving said plunger member,
the surface of said pushing portion defining printing indicia configured for receiving printing ink from an associated source, said printing indicia comprising at least one relatively raised printing surface spaced from the remaining surface of said pushing portion, so that after consumption of said confection, said plunger member can be removed from said cylindrical tube and used as a novelty ink stamp by application of printing ink to the printing indicia of said pushing portion.

2. A frozen confection package in accordance with claim 1, wherein
said pushing portion of said plunger member includes a peripheral skirt extending generally from said surface in the direction of said handle portion.

3. A frozen confection package in accordance with claim 1, wherein
said handle portion of said plunger member is formed unitarily with said pushing portion.

4. A frozen confection package in accordance with claim 1, wherein
said relatively raised printing surface is spaced from the remaining surface of said pushing portion by about 0.03 inches to facilitate use of the plunger member as an ink stamp.

5. A frozen confection package in accordance with claim 4, wherein
said raised printing surface has a transverse dimension of at least about 0.04 inches to further facilitate use of said plunger member as an ink stamp.

6. A frozen confection package in accordance with claim 1, wherein
said cylindrical tube comprises spirally wound paper material.

7. A frozen confection package in accordance with claim 1, including
   an end seal closing the other end of said cylindrical tube for covering the frozen confection.

8. A method of using a package for a frozen confection, comprising the steps of:
   providing a package including a cylindrical tube for holding a frozen confection, and a plunger member slidably positioned within said tube, with said plunger member including a generally planar pushing portion having a surface defining printing indicia for receiving printing ink, and a handle portion extending from said pushing portion, said printing indicia comprising at least one relatively raised printing surface spaced from the remaining surface of said pushing portion;
   removing said plunger member from said cylindrical tube; and
   applying printing ink to the printing indicia on said pushing portion of said pushing member, and using said pushing member as an ink stamp.

* * * * *